3,036,885
PROCESS FOR THE PRODUCTION OF CARO'S ACID SALTS AND SOLUTIONS THEREOF
Josef Müller and Franz Beer, Rheinfelden, Baden, Germany, assignors to Deutsche Gold- und Silber-Scheideanstalt vormals Roessler, Frankfurt am Main, Germany
No Drawing. Filed Nov. 9, 1959, Ser. No. 851,510
Claims priority, application Germany Nov. 15, 1958
3 Claims. (Cl. 23—114)

The present invention relates to an improved process for the production of Caro's acid salts, particularly the alkali metal salts, or solutions thereof.

Previously, in the production of salts of Caro's acid, it was in general customary to start from persulfuric acid which was partially hydrolyzed to Caro's acid, whereupon the hydrolysis was stabilized through cooling and addition of alkali metal compounds and the resulting solution evaporated down with separation of the excess sulfate. According to another procedure, highly concentrated hydrogen peroxide is reacted with concentrated sulfuric acid whereby about 80% of the active oxygen is converted to Caro's acid from which the solid salts can be recovered as indicated above by neutralization and evaporating down.

According to the invention it was found that salts of Caro's acid can easily be produced in stable dissolved form by reacting the corresponding persulfate salts with hydrogen peroxide in the presence of sulfuric acid and that the reaction mixture produced can also easily be converted to the solid salts. In order that the process according to the invention be carried out successfully, it was found essential that the quantity of water in the reaction mixture does not exceed 1 mol per mol of hydrogen peroxide and per mol of persulfate contained therein. This is achieved according to the invention by selecting the concentration of the reactants so that the water produced by the portion of the reaction delivering water is consumed as much as possible by a simultaneously occurring water consuming reaction according to the following equations:

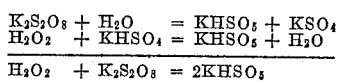

$$\frac{K_2S_2O_8 + H_2O = KHSO_5 + KSO_4}{H_2O_2 + KHSO_4 = KHSO_5 + H_2O}$$
$$H_2O_2 + K_2S_2O_8 = 2KHSO_5$$

It is possible in this way to retain almost 100% of the active oxygen content in the reaction mixture and to transfer over 90% of the active oxygen content to the salts of Caro's acid produced. Expediently, the hydrogen peroxide used is as concentrated as possible and the sulfuric acid used is concentrated sulfuric acid or oleum. The proportions of the reaction mixture components preferably are so selected that the reaction mass forms a homogeneous viscous liquid as in a mixture of pasty consistency the reaction does not fully go to completion. The concentration of the reaction components or respectively their proportions should be so selected that the reaction mixture does not contain over 1 mol of water per mol of hydrogen peroxide and per mol of alkali metal or ammonium persulfate, and that at least 2 mol, preferably 2.5 mol, of sulfuric acid (calculated as $SO_3$) in the form of concentrated sulfuric acid or oleum are provided for each mol of each of hydrogen peroxide and persulfate.

The most favorable reaction temperature lies between 40 and 70° C., preferably at 60° C.

When the salts of the Caro's acid produced according to the invention are to be recovered in solid form, the reaction mixture after completion of the reaction at temperatures between 40 and 70° C. is cooled down, diluted, an alkali added until its pH is about 1–2 and then carefully evaporated to dryness. The dried salt mixture thus obtained is stable and contains 5–7% of active oxygen.

The losses in active oxygen incurred in the process according to the invention are in no instance over 5% and in many instances are not over 1% while the yield of Caro's acid salts is over 90%.

It is advisable to use reaction mixtures which contain 0.5 to 1.5 moles of persulfate per mol of hydrogen peroxide.

The following examples will serve to illustrate several embodiments of the invention.

*Example 1*

38 g. of 90% by wt. of hydrogen peroxide (corresponding to 1 mol) and 76 g. of potassium persulfate (corresponding to 0.282 mol) were added simultaneously to 140 g. of fuming sulfuric acid containing 23.6% of $SO_3$ (corresponding to 1.5 mol $SO_3$). The mixture was stirred and cooled to maintain a temperature of about 40° C. After a reaction period of about 20 minutes, the mixture was diluted with 400 g. of ice. The resulting solution contained 93.2% of the original active oxygen content (supplied as hydrogen peroxide and persulfate) in the form of Caro's acid, 3.48% as hydrogen peroxide and 2.32% as persulfuric acid. The active oxygen in the reaction mixture therefore was still 99.1% of the original. The pH of the solution was adjusted to 1–2 by the addition of aqueous potassium hydroxide and then carefully evaporated to dryness. A solid stable salt mixture containing about 7% of active oxygen was obtained. Similar results were obtained when aqueous sodium hydroxide was employed for the neutralization instead of the potassium hydroxide solution.

*Example 2*

235.1 g. of fuming sulfuric acid containing 21% of $SO_3$ (corresponding to a total of 2.5 mol of $SO_3$), 300 g. of potassium persulfate (1.111 mol) and 68 g. of 50% by weight of hydrogen peroxide (1 mol) were mixed together and maintained at about 60° C. while stirring for 10 minutes. Thereafter, the reaction mixture was cooled to 20° C. and diluted with water. The total active oxygen content in the reaction product was 95.13% of which 90.1% was in the form of Caro's acid, 3.73% in the form of hydrogen peroxide and 1.2% in the form of persulfuric acid. The reaction solution was processed to produce the solid alkali metal salts as in Example 1.

*Example 3*

40.8 g. of 83.4% by weight hydrogen peroxide (1 mol) and 300 g. potassium persulfate (1.111 mol) were added to 250 g. of 98% sulfuric acid (2.5 mol). After heating the reaction mixture to 60° C. for 10 minutes it was cooled down and diluted. The total active oxygen content in the reaction product was 97.7% of which 91.7% was in the form of Caro's acid, 3.2% in the form of hydrogen peroxide and 2.8% in the form of persulfuric acid. The solid salts were recovered therefrom as in Example 1.

When, contrary to the above examples, the quantity of sulfuric acid employed was too low, for example, if only 1 mol of sulfuric acid was employed for 1 mol of hydrogen peroxide and 1.111 mol of potassium persulfate, the resulting solution only contained 64% of active oxygen in the form of Caro's acid. Similar results were obtained when potassium persulfate was reacted only with sulfuric acid or oleum without addition of concentrated hydrogen peroxide. In this case, only 20% of the active oxygen was in the form of Caro's acid whereas 74.1% remained as undissolved potassium persulfate.

Example 4

0.5 mol of ammonium persulfate and 0.5 mol of hydrogen peroxide in the form of a 70% by weight aqueous solution were added to 97.2 g. of oleum containing 25% of $SO_3$ (corresponding to a total of 1.05 mol $SO_3$) at 40° C. After short heating to 60° C. the reaction mixture was diluted with water to 490 cc. while cooling. The yield of active oxygen as $H_2SO_5$ amounted to 90.4%. The resulting solution was neutralized with a dilute aqueous ammonia solution (0.164 mol) and with soda (0.5265 mol) in saturated aqueous solution. The neutralization yield was almost quantitative. Upon drying the solution a dry stable salt containing 5.95% of active oxygen was obtained. Its stability substantially corresponded to that of the potassium salt.

We claim:

1. A process for the production of salt solutions of Caro's acid which comprises reacting hydrogen peroxide and a persulfate selected from the group consisting of alkali metal and ammonium persulfates in intimate contact with at least 2 mol of sulfuric acid calculated as $SO_3$ per 2 mol of the hydrogen peroxide plus the persulfate and in the presence of less than 1 mol of water per mol of each of hydrogen peroxide and persulfate at a temperature between 40 and 70° C.

2. The process of claim 1 in which said reaction is carried out in the presence of about 2.5 mol of sulfuric acid calculated as $SO_3$ per 2 mol of the hydrogen peroxide plus the persulfate.

3. The process of claim 1 comprising in addition cooling the reaction mixture after completion of the reaction, diluting the reaction mixture with water, adding an alkaline reacting substance selected from the group consisting of alkali metal and ammonium alkaline reacting compounds to adjust the pH of the solution to 1–2 and evaporating the resulting solution to dryness.

References Cited in the file of this patent

UNITED STATES PATENTS 2,955,020  Darbee et al. _____ Oct. 4, 1960

OTHER REFERENCES

Price: "Per-Acids and Their Salts," Monographs on Inorganic and Physcial Chemistry, Longmans, Green and Co., New York, 1912, pages 33 and 52.